Patented Mar. 26, 1946

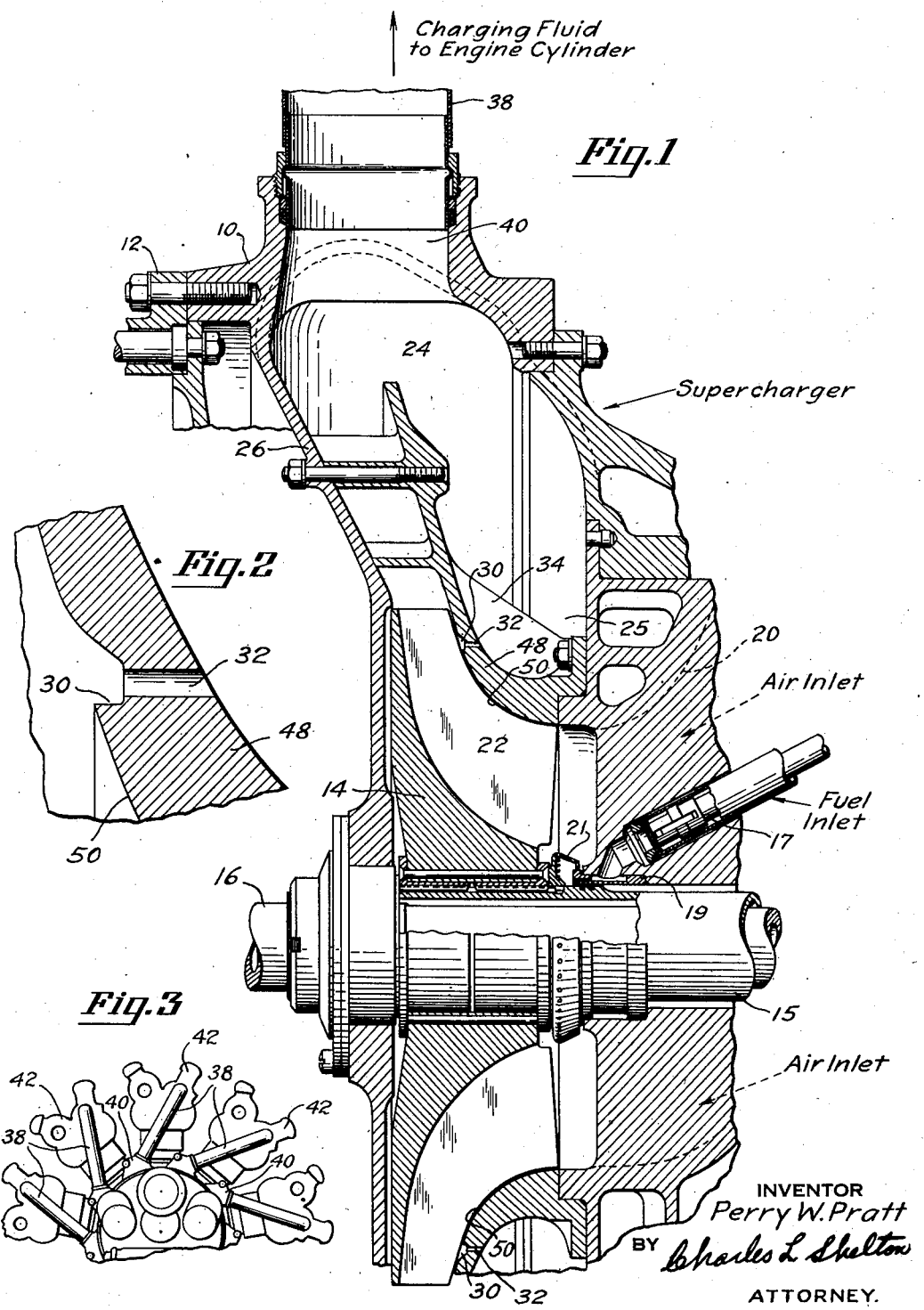

2,397,327

UNITED STATES PATENT OFFICE 2,397,327

ENGINE INDUCTION APPARATUS

Perry Walter Pratt, Manchester, Conn., assignor to United Aircraft Corporation, East Hartford, Conn., a corporation of Delaware Application November 27, 1943, Serial No. 511,961

5 Claims. (Cl. 261—90)

This invention relates to a means for improving fuel distribution among the cylinders of an internal combustion engine. An object of this invention is to provide an improvement in a charging apparatus for internal combustion engines, and particularly for radial aircraft engines, for effecting better carburetion and more equal distribution of fuel among the engine cylinders.

Other objects and advantages will be apparent from the specification and claims, and from the accompanying drawing which illustrates what is now considered to be a preferred embodiment of the invention.

In the drawing,

Fig. 1 shows a partial sectional view of a radial aircraft engine supercharger which incorporates one embodiment of my invention.

Fig. 2 is an enlarged sectional view of a portion of Fig. 1.

Fig. 3 is a schematic view on a reduced scale showing the relationship between the supercharger and the engine cylinders and induction pipes.

In engines incorporating superchargers and utilizing liquid fuels, the fuel distribution among the engine cylinders has frequently been nonuniform. Such nonuniformity results in unequal cylinder heating and power output resulting in a loss in total power output, increased engine vibration, and overheating.

According to this invention, liquid fuel, which may have been thrown radially outward by the supercharger impeller blades to collect on the outer wall of the supercharger passage, is blown off the supercharger wall and back into the fuel-air mixture before it is discharged outwardly by the impeller tips. I have found that if this liquid fuel is thus blown back into the charging fluid, preferably at a position near where it collects and while the charging fluid is still being impelled by the supercharger vanes, it will be equally distributed, circumferentially of the supercharger, into the supercharger diffuser section and thence among the engine cylinder induction pipes. I have discovered that this result can be efficiently and reliably accomplished by simply recirculating or bleeding air from the collector ring, on the discharge side of the supercharger, into the supercharger passage at a point intermediate the ends of the impeller blades.

Referring to the embodiment of the invention shown in the drawing, a supercharger comprising a casing 10 may be mounted on an engine supported structure 12. Supercharger impeller 14 is splined to and driven by the hollow shaft 15, which may be connected, in a conventional manner, to an engine driven shaft 16 through a speed increasing gear train (not shown).

Air entering the supercharger through air inlet 20 is forced by the rapidly rotating impeller vanes 22 into an annular collector ring 24.

Diffuser section 26, incorporating the conventional stationary diffuser vanes defining expanding passages extending between the periphery of the impeller and the collector chamber acts to slow down the air leaving the impeller, or in other words acts to change a portion of the velocity pressure of the air leaving the impeller vanes 22 to static pressure in the collector chamber 24. Thus the air or charging fluid in chamber 24 will always, during operation of the supercharger, be at a static pressure which is a function of the velocity pressure of the air within the impeller passages and which is higher than the static pressure of the air passing through the impeller passages between vanes 22.

From the collector chamber 24 the charging fluid is introduced to respective engine cylinders 42 (Fig. 3) through induction pipes 38 connected with circumferentially spaced outlets 40 projecting from the collector ring. According to present practice one such outlet and induction pipe is provided for each engine cylinder.

Fuel is introduced into the air passing through the supercharger at the inlet side thereof by a fuel inlet pipe, in which is positioned a discharge valve 17 actuated in a known manner to maintain the pressure of the fuel introduced into the airstream at a substantially constant value above the pressure of the airstream. A conventional pressure type carburetor may be provided for proportioning the quantity of fuel introduced into the airstream in predetermined relation to the rate of flow by weight of air to the engine.

After issuing from the discharge valve the fuel passes into an annular cavity formed by the ring 19, which is fixed relative to the supercharger casing, and then through a series of circumferentially arranged orifices into the fuel spinner 21. Spinner 21 is splined to and rotates with shaft 15 and has inwardly directed sides which form an annular fuel reservoir or chamber. Rotation of the spinner maintains an annular bed of fuel therein by centrifugal force, from which the fuel is equally distributed, circumferentially of the impeller axis, into the airstream passing through the impeller.

Such a fuel distributing device, as disclosed and claimed in the Buck Patent No. 2,287,021, assigned to applicant's assignee, will provide a substantially equal distribution of fuel about the spinner axis, as the fuel is thrown centrifugally from the spinner cup 21. However, in some engines liquid fuel which is thrown outwardly by the spinner 21 and the impeller vanes 22 will impinge upon and cling to the outer surfaces 50 of the supercharger passages. This liquid fuel then flows along the surface of the supercharger passages and because of the effects of gravity, fuel surface tension, and roughness of the passage surfaces will become unequally distributed around the axis of the impeller, the diffuser section, and the collector chamber. In such engines some cylinders will, therefore, be supplied with more fuel than others, and even if the fuel is completely vaporized engine operation will be uneven because of differing fuel-air ratios in different cylinders, with resulting material disadvantages.

In the embodiment of my invention shown, this difficulty is corrected, with resulting improvement in engine cooling characteristics, higher power output, improved vibration characteristics, and better fuel economy, in the following manner.

Collector chamber 24 is extended inwardly at 25 to a position where it surrounds the outer supercharger passage wall 48 at a point radially inward of the outer periphery of supercharger vanes 22. Reinforcing ribs 34 may be provided if desired to strengthen wall 48. On the inner surface of the supercharger wall 48 an annular or circular groove 30, preferably of trapezial cross-section (Fig. 2), is provided, with a circumferentially extending series of small holes 32 connecting the portion 25 of the collector chamber with the circular groove 30. For example, a supercharger having an impeller approximately eleven inches in diameter might be provided with about 40 such holes, each hole being of about .06 inch in diameter and all the holes being equally spaced about the impeller axis. The groove 30 may be of a depth approximating the diameter of a bleed hole and of a width at its widest point which is several times as great as a hole diameter. Preferably, the outer side of the groove is faired or blended into the surface 50, the groove forming a relatively dead air pocket disposed outwardly of the main flow of charging fluid over surface 50.

The static pressure in chamber portion 25 is always greater, during supercharger operation, than the static pressure of the air passing through the impeller passages and there will be a continuous bleed of a small quantity of air from the collector portion 25 through restricted passages 32 and into groove 30 and the impeller passage. Because holes 32 are small in size the amount of air so recirculated will be negligible in relation to the total amount of air passing through the supercharger. Liquid fuel flowing outwardly over the surface 50 toward the engine cylinders will flow into the annular recess 30 and would tend to collect there and be discharged unevenly in drops or globules into the airstream if it were not for the provision of the air bleed passages 32. However, the amount of air recirculating is made sufficiently great by providing a sufficient number and size of holes to blow any liquid fuel passing into the groove 30 back into the main fluid stream, causing it to mix therewith before any appreciable or unequally distributed quantity of fuel is collected in the groove. The jets from nozzles 32 form a substantially continuous annular stream of auxiliary fluid of relatively high velocity, directed generally transversely of the main fluid stream pumped through the impeller. Thus, there will be relative motion between the main fluid stream and the fuel blown or carried with the auxiliary fluid stream, resulting in better fuel-air mixing or carburetion.

Shallow grooves 30 are believed to act not only as a catch basin for liquid fuel flowing over the surface 50 but also as a pressure equalizer for the fluid jets issuing from the series of holes 32. This combination, of a shallow annular groove into which discharges a large number of very small jets of air from collector portion 25, forms the equivalent of a circumferentially continuous spray or blanket of air, which blows substantially all the liquid fuel collecting on the supercharger wall off the wall and into the airstream before this liquid fuel has become unequally distributed around the axis of the impeller, and before the charging fluid has left the impeller passages. After being blown off the wall 50 the fuel is mingled with the airstream passing through the passage enclosed by vanes 22 and is then thrown outwardly into the diffuser section 26, in an equally distributed condition.

The process of compression considerably increases the temperature of the charging fluid and therefore the temperature of the fluid recirculated through the passages 32 is somewhat higher than the temperature of the fluid as it initially passes into the impeller and through the impeller passages. It is thought that this is a material factor in the success of my invention in that it tends to facilitate vaporization of the fuel. Whatever the reason, the means disclosed herein provides considerably improved results in fuel distribution and in fuel vaporization as compared with prior art arrangements concerned mainly with the creation of turbulence in the charging fluid.

While in the embodiment shown a large number of air bleeds 32 have been provided, equally spaced about the axis of the impeller, it will be understood that it is within the scope of this invention to provide a circumferentially continuous air bleed, which could be in the form of a very narrow continuous annular slot or annular nozzle, concentric with the impeller axis. Other sources of fluid under pressure may also be used to supply nozzles 32 to provide an auxiliary or independent fluid stream directed inwardly toward the axis of the main fluid stream.

It is to be understood that the invention is not limited to the specific embodiment herein illustrated and described, but may be used in other ways without departure from its spirit as defined by the following claims.

I claim:

1. In a centrifugal blower, a casing, a rotatable impeller having vanes forming vaned passages within said casing, a collector chamber around said casing, a plurality of circumferentially spaced outlets connected with said chamber, nozzle means in a wall of said casing for discharging a substantially annular jet of fluid into said vaned passages, and a recirculating passage connecting said collector chamber with said nozzle means.

2. In an aircraft engine supercharger, a rotatable shaft, a vaned impeller rotatable with said shaft, a fixed wall cooperating with said rotatable impeller to form vaned impeller passages, an inlet opening for admitting air to said vaned passages, means for discharging liquid fuel into the air admitted to said vaned passages through said inlet, a plurality of outlet openings for receiving the fuel-air mixture from said vaned passages, and means for uniformly distributing said fuel among said outlet openings including at least one annular groove in said fixed wall spaced radially inward from the periphery of said vaned passages for collecting unvaporized fuel and discharging it into the fuel-air mixture passing through said vaned passages before said mixture is discharged from said passages.

3. In an aircraft engine having induction pipes connecting respective engine cylinders with a collector chamber, an impeller having vanes thereon for discharging a fuel-air mixture into said collector chamber, a wall between said impeller and said collector chamber cooperating with said vanes to form impeller passages, an annular groove in said wall open to said impeller passages, and a plurality of restricted openings through said wall communicating with said groove.

4. In an aircraft engine having induction pipes connecting respective engine cylinders with a collector chamber, an impeller having vanes thereon for discharging a fuel-air mixture into said collector chamber, a wall around said impeller and cooperating with said vanes to form impeller passages, an annular groove in said wall open to said impeller passages, and a plurality of restricted openings through said wall communicating with said groove and connected with said collector chamber.

5. A blower comprising, a rotatable impeller and a fixed wall cooperating with said impeller to form an induction passage for a fuel-air stream, means forming a substantially annular nozzle in said fixed wall around the axis of said impeller for directing an auxiliary fluid stream into said induction passage, and means for supplying said annular nozzle with a fluid at a temperature and pressure which is higher than the temperature and pressure of the fuel-air stream passing through said induction passage.

PERRY WALTER PRATT.